July 26, 1938.     C. U. TYRRELL     2,124,659
GEOMETRICAL INSTRUMENT
Filed Oct. 2, 1935
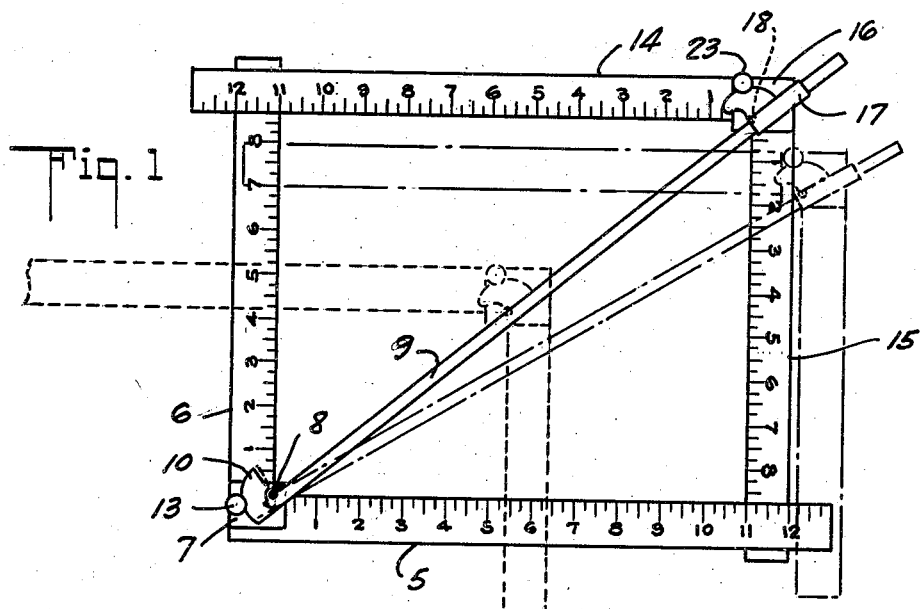
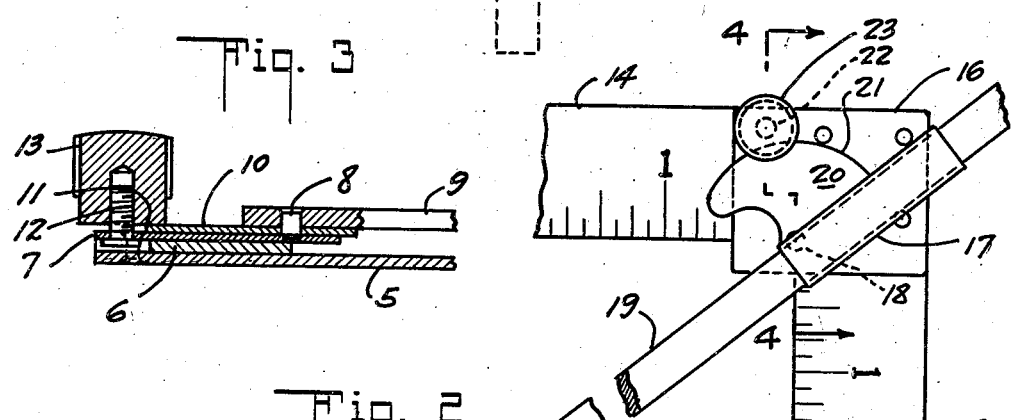
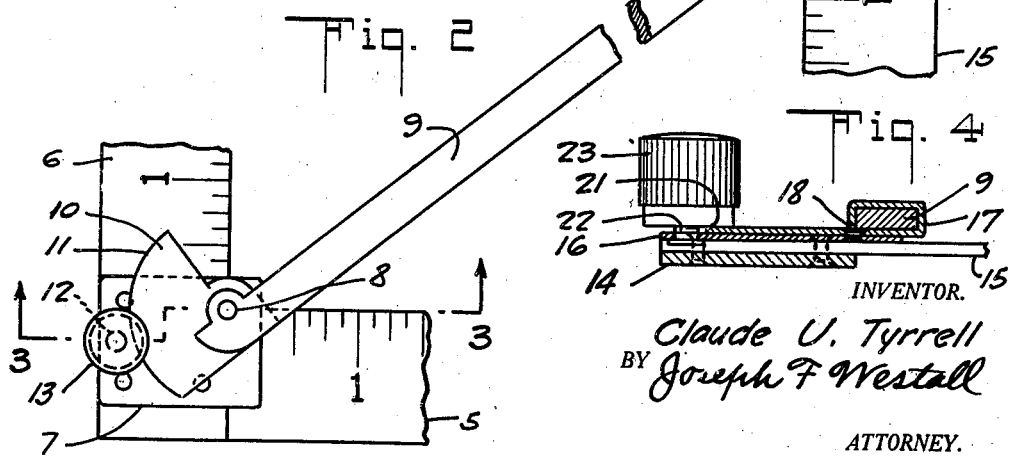
INVENTOR.
Claude U. Tyrrell
BY Joseph F Westall
ATTORNEY.

Patented July 26, 1938

2,124,659

UNITED STATES PATENT OFFICE 2,124,659

GEOMETRICAL INSTRUMENT

Claude U. Tyrrell, Pasadena, Calif.

Application October 2, 1935, Serial No. 43,199

4 Claims. (Cl. 33—98)

This invention relates to a device for forming, spacing, measuring, and proportioning the dimensions of a quadrilateral or right triangle, and, specifically, ascertaining the dimensions of such a figure proportionately reduced or enlarged. In the photographic, editing or advertising arts in which the present invention is particularly adaptable for use, the proportioning of cuts prepared from photographs, sketches or the like, to the printed text accompanying such cuts, within the limits of the space allowed for the combined copy, usually requires some variation in the size of such cuts from the original. The engraver preparing the plates from such original pictures must have accurate information as to the dimensions of the plate to be reduced or enlarged from the original drawing or photograph. In the art prior to my invention this is usually accomplished by time-consuming algebraic calculations or by the use of a slide-rule which require special knowledge. Errors in such mathematical reasoning or in the reading or use of the slide-rule are both costly in time and wasteful of materials.

It is a basic object of the present invention to avoid the possibility of the errors of prior art methods by the provision of a device comprising a plurality of graduated strips which may be adjusted to conform to the dimensions of any quadrilateral containing two right angles and embodying means to secure the angles between said right angles from alteration, thus permitting facility in determining the dimensions of such a quadrilateral, and dexterity in its transference to another surface.

A second and highly important object of my invention is to provide a device embodying adjustable scales to form or measure the sides of a quadrilateral, and which, once set, is adaptable by simple manual actuation, to denote the relative dimensions in inches or other measure of length, of the sides of all figures in direct proportion thereto.

Another object hereof is to provide a device by which the relative dimensions and position of both text and cuts, may be conveniently determined and arranged to present a pleasing appearance and enable the most efficient use of the space provided for the complete copy.

Another object is to provide a device of the character noted in the preceding objects which embodies simplicity and durability of construction, facility of adjustment and operation, and accuracy in result.

In the drawing—

Fig. 1 is a plan view of my invention with dotted lines indicating, respectively, a proportionate reduction of the measured area and another adjustment of the parts;

Fig. 2 is an enlarged, detailed view of principal parts, depicting their relative association;

Fig. 3 is a sectional view on line 3—3 of Fig. 2; and

Fig. 4 is a section on line 4—4 of Fig. 2.

In referring to the drawing in detail, the numerals of which indicate similar parts throughout the several views, 5 and 6 designate a pair of wooden, bakelite, or metal strips riveted together to form a right angle. The edges of each of the strips are graduated with any suitable measure of length, such as in inches as shown in Fig. 2, from the vertex of the angle outwardly to their respective ends. Riveted, or otherwise secured to the intersection of the graduated faces of strips 5 and 6 is a reinforcing plate 7, having one of its corners extending slightly into the right angle for a purpose about to be described.

Concentric with the point of intersection of the inner graduated edges of strips 5 and 6, a stud 8, is secured, preferably extending through a hole bored in reinforcing plate 7, and riveted so as to form an integral part of said plate. A diagonal bar 9 is pivoted on stud 8 by means of a retaining plate 10 as will be more in detail described. Plate 10 comprises a thin sheet of metal having two straight edges relatively disposed at right angles, with their opposite ends connected by a single circular edge 11. A hole is bored through said plate to permit the circular edge 11, when the plate is pivoted on stud 8, to maintain equal proximity relative to the shank of a threaded bolt 12 projecting through and secured integrally with plate 7, adjacent the outer edge thereof. A knurled nut 13 for bolt shank 12 is provided, when tightened, to prevent, by frictional engagement therewith, rotative movement of said retaining plate 10 as will be obvious to those of skill in this art. Bar 9, riveted to plate 10, is semicircularly cut away at its end to half encircle the hole in said plate, thus enabling the plane of the edge of bar 9, when plate 10 is in operative position on stud 8, to pass through the center of said stud and the vertex of the right angle formed by strips 5 and 6. Nut 13 will allow free adjustment, when screwed loose, of plate 10 and bar 9, relative to strips 5 and 6, and will maintain such adjusted position when tightened on bolt 12.

A second pair of strips 14 and 15, identical with strips 5 and 6, are similarly secured and graduated. Reinforcing plate 16 is riveted at the intersection of strips 14 and 15, in the same manner as is plate 7 with respect to strips 5 and 6, so as to extend slightly over the vertex of the angle formed by the graduated edges of strips 14 and 15.

A bracket 17 having a rectangular aperture for the slidable reception of the opposite end of bar 9 is pivotably mounted on plate 16 by a rivet 18 concentrically with the apex of the angle formed by the inner edges of strips 14 and 15. Bracket 17 is positioned on said plate to permit the plane of the side 19 of the bar, which passes through a point concentric with rivet 18 to also pass through a point directly above the vertex of the inner right angle formed by strips 14 and 15. Side 19 of bar 9 thus provides a diagonal line of any quadrilateral plane formed by the strips 5, 6, 14, and 15. A flange 20 having a circular edge 21, protrudes from a lower side of said bracket, said edge 21 being curved so as to maintain equal adjacency with respect to the threaded upwardly-extending shank of a bolt 22 which protrudes through a hole in plate 16 near the outer edge thereof, and secured by any well known means. A knurled nut 23, screwed on the shank of bolt 22, will clamp edge 21 and bar 9 in any adjusted position relative to the angle of strips 14 and 15.

As is well known in the art, a proportionate change in the size of any quadrilateral plane surface is directly proportional to the length of a diagonal of said surface. In the operations of my invention, the dimensions of any quadrilateral containing two right angles, may be determined by loosening nuts 13 and 23 and the sides 5, 6, 14, and 15, manually arranged to correspond with the given figure. By clamping the diagonal in position through the medium of nuts 13 and 23 the four angles are thus relatively set and will be maintained regardless of any change in the length of the diagonal bar or sides of the figure. The figure may thus be proportionately reduced or enlarged by movement of the angle formed by strips 14 and 15 toward or from, respectively, its diagonally-opposite angle, and the new dimensions easily and quickly determined.

As above generally noted, right triangles may be similarly spaced, measured and proportionately reduced or enlarged to any size, by pivoting one of the right angles so that the respective ends thereof intersect the same strip of the second angle or square.

It will also be obvious to those of skill in this art that various changes in relative size and proportion of the various parts; the means of securing the diagonal; and several different measures of length may be substituted for that illustrated, without departing from the spirit of my invention.

What I claim and desire to cover by Letters Patent is:

1. In a geometrical instrument of the character described, two pairs of strips, the strips of each pair relatively secured to form an angle and uniformly and individually graduated from their relatively connected ends to their outer free ends, a bar pivoted to the intersection of one pair of said strips, a flange integral with said bar, means to clamp said flange to said last-mentioned strips, a bracket pivoted at the vertex of the angle formed by said second pair of strips to slidably retain said bar, a flange integral with said bracket, and means to clamp said last-mentioned flange to said second pair of strips.

2. In a device of the character described, a square comprising two strips, a bar pivoted at the vertex of said strips and extending into the right angle formed by said square, a second square comprising a pair of strips with the right angle thereof oppositely-disposed relative to said first-mentioned square, a bracket pivoted at the vertex of the angle of said second square for the slidable retention of said bar, a flange integral with said bracket and means to releasably clamp said flange to said second square.

3. In a geometrical instrument, a pair of strips rigidly connected to form an angle, each of said strips being uniformly and individually graduated from their relatively connected ends outwardly to their opposite ends, a second pair of strips rigidly connected to each other to form a second angle, each of said second pair of strips being uniformly and individually graduated from their relatively connected ends outwardly to their opposite ends, a diagonal bar pivotally secured to the first pair of strips at the vertex of their angle, a member having an arcuate edge secured to said bar, means to clamp said member to said first pair of strips, a bracket pivoted at the vertex of the angle of said second pair of strips, adapted to slidably retain said bar in pivotal engagement therewith, and means to clamp said bracket to said second pair of strips to fix the angle of said bar therewith.

4. In a geometrical instrument, a pair of strips rigidly connected to form an angle, each of said strips being uniformly and individually graduated from their relatively connected ends outwardly to their opposite ends, a second pair of strips rigidly connected to each other to form a second angle, each of said second pair of strips being uniformly and individually graduated from their relatively connected ends outwardly to their opposite ends, a diagonal bar slidably and pivotally connected to one pair of said strips at the vertex of the angle formed thereby and pivotally connected at the other pair of said strips at the vertex of their angle, and means to fix the relative movement of said bar with each pair of strips to thereby fix the relative position of the pairs of strips.

CLAUDE U. TYRRELL.